United States Patent [19]
Kakei et al.

[11] 3,745,906
[45] July 17, 1973

[54] DEFROSTER
[75] Inventors: Jun Kakei; Hirotsugu Yamaguchi, both of Yokohama, Japan
[73] Assignee: Nissan Motor Company, Limited, Yokohama City, Japan
[22] Filed: June 28, 1971
[21] Appl. No.: 157,404

[52] U.S. Cl.................. 98/2.09, 137/81.5, 239/284
[51] Int. Cl............................................... B60h 1/24
[58] Field of Search................ 98/2, 2.1, 2.04–2.09, 98/2.19; 137/81.5; 239/284

[56] References Cited
UNITED STATES PATENTS

| | | | |
|---|---|---|---|
| 3,185,166 | 5/1965 | Horton | 137/81.5 |
| 3,204,652 | 9/1965 | Bauer | 137/81.5 |
| 3,423,026 | 1/1969 | Carpenter | 137/81.5 |

*Primary Examiner*—Meyer Perlin
*Attorney*—Robert E. Burns et al.

[57] ABSTRACT

Herein disclosed is a defroster for defrosting a windshield of a motor vehicle. The defroster has a defroster nozzle having a generally rectangular, laterally elongated cross section which is gradually enlarged toward an outlet opening formed at the foremost end of the defroster nozzle. A hot fluid jet is passed to this defroster nozzle and is sprayed onto the windshield through the outlet opening. The path of the fluid jet issuing from the defroster nozzle is periodically switched from one side wall of the defroster nozzle to the other so that the fluid jet is caused to spurt at varying angles in a side-to-side direction. The flaring configuration of the defroster nozzle is useful to provide a wall-attachment effect between the fluid jet and the inner surfaces of the side walls of the defroster nozzle. The windshield is thus defrosted practically throughout its total area, providing a clear frontal viewing from within the motor vehicle.

4 Claims, 21 Drawing Figures

PATENTED JUL 17 1973 3,745,906

DEFROSTER

This invention relates to a defroster for use in a motor vehicle and more particularly to a defroster which is adapted to defrost or defog a windshield of a motor veyicle by a hot fluid jet applied to the windshield.

Drawbacks thus far inherent in the prior art defrosters and the features and advantages of the defroster embodying this invention to eliminate such drawbacks will be understood from the following description taken in conjunction with the accompanying drawings, in which.

Figure 1:
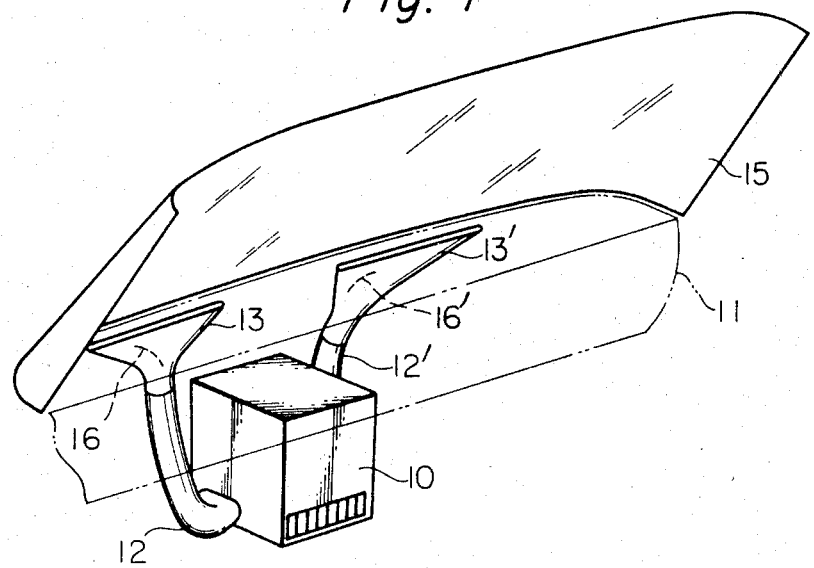
FIGS. 1 and 2 are schematic perspective views showing typical examples of the prior art defroster arrangement.
Figure 2:
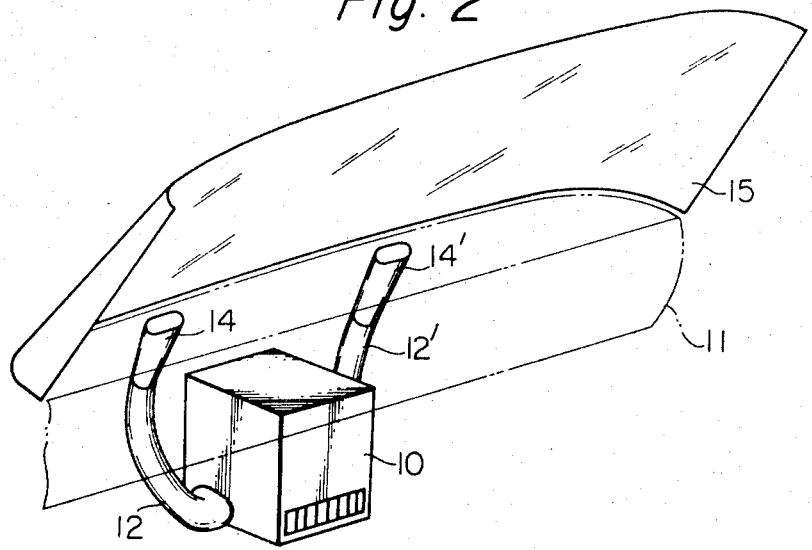

Reference is now made to FIGS. 1 and 2 illustrating representative examples of the prior art defroster for a motor vehicle. As shown, th defroster includes a heater 10 which is usually installed underneath an instrument panel 11 of the motor vehicle and which supplies a hot fluid jet (which is in most cases a jet of heated air). This hot fluid jet is passed through ducts 12 and 12' to a pair of defroster nozzles 13 and 13' (FIG. 1) or 14 and 14' (FIG. 2). These defroster nozzles have respective outlet openings which are directed toward a lower portion of a windshield 15 so that the hot fluid jet passed to the defroster nozzles 13 and 13' or 14 and 14' is forced to impinge upon an inner surface of the windshield. In order that the windshield is swept by the hot fluid jet uniformly throughout its surface, the outlet openings of the defroster nozzles 13 and 13' are laterally elongated to closely follow the configuration of the windshield 15 and, at the same time, suitable guide vanes 16 and 16' are usually mounted in the defroster nozzles, as seen in FIG. 1. For the purpose of reducing loses of the flow velocity and temperature of the hot fluid jet to be applied to the windshield, the outlet openings of the defroster nozzles 14 and 14' may be generally oval-shaped to reduce the cross sectional areas of the fluid jet spurting therefrom, as seen in FIG. 2.

Figure 3:
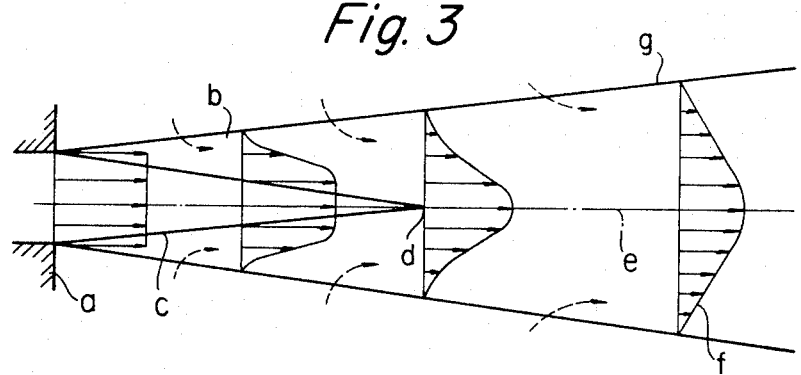
FIG. 3 is a chart showing flow velocity distributions of a fluid jet from a usual defroster nozzle.

As shown in FIG. 3, the fluid jet issuing out of a defroster nozzle, designated generally by $a$, entrains thereon a surrounding fluid or atmospheric air due to a velocity gradient between the fluid jet and the surrounding fluid, as indicated by arrows in broken lines. It therefore follows that a boundary layer $b$ made up of a mixture of the hot fluid jet and the surrounding fluid is created around the flow field of the fluid jet. The thickness of this boundary layer $b$ increases as the fluid jet advances so that a core $c$ of the fluid jet maintaining the initial velocity decreases until it disappears at point $d$. The flow velocity of the fluid jet on a central streamline $e$ downstream of the point $d$ decreases inversely proportionally to a square root of the distance from the outlet opening of the defroster nozzle $a$ as observed from flow velocity distribution charts $f$, while a boundary $g$ of the flow field linearly expands forwardly. Experiments have revealed that these flow characteristics of the fluid jet from the defroster nozzle as shown in FIG. 3 can be generally translated into temperature characteristics of the fluid jet.

Figure 4:
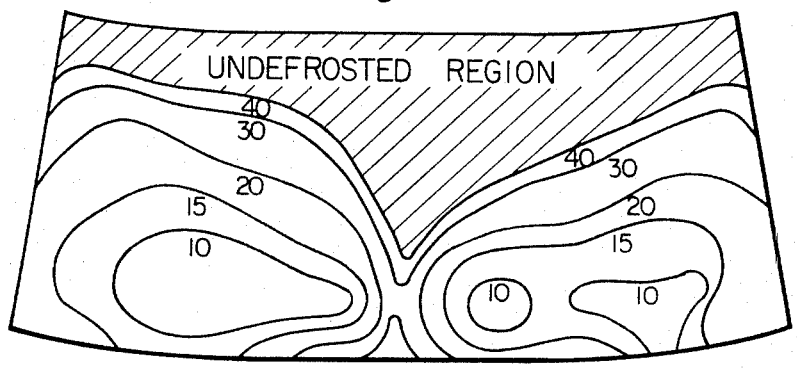
FIGS. 4 and 5 are views showing patterns of defrosted regions as attained with use of the prior art defrosters shown in FIGS. 1 and 2, respectively.

With the nozzle arrangement of the defroster shown in FIG. 1, therefore, the tendency of the surrounding fluid being entrained on the adjacent fluid jet is pronounced because of the considerably large cross sectional area of the fluid jet and, at the same time, the core of the fluid jet maintaining the initial velocity is considerably shortened because of the provision of the guide vanes 16 and 16'. The hot fluid jets from the defroster nozzles 13 and 13' are thus subject to extreme loses in the flow velocity and temperature with the result that the boundary layers are so thickened as to deteriorate the efficiency of the transference of heat to the windshield and that the hot fluid jets fail to reach the upper end portion of the windshield. FIG. 4 illustrates patterns of the regions defrosted in 10, 15, 20 and 30 minutes after the defroster of the type shown in FIG. 1 has started operation, in which it is seen that the defrosted areas spread laterally of the windshield leaving the upper portion (shown hatched) of the windshield unswept with the hot fluid jet. The nozzle arrangement of the defroster shown in FIG. 1 has another drawback in that meticulous skills are indispensable in assembling the defroster nozzle into the defroster at angles providing optimum directions of the fluid jets therefrom; the defrosting efficiency depends critically upon the directions of the fluid jets relative to the surface of the windshield. The nozzle arrangement of this nature is thus not fully acceptable for the clear frontal viewing from within a motor vehicle, in spite of its total side-to-side coverage on the windshield.

With the nozzle arrangement of the defroster of the type shown in FIG. 2, the tendency of the surrounding fluid being entrained on the fluid jet is lessend because of the limited cross sectional area of the fluid jet. The core of the fluid jet is accordingly prolonged with consequent decreases in the loses of the velocity and temperature of the fluid jet and in the thickness of the boundary layer. The heat is transferred to the windshield at an increased efficiency and the fluid jet is permitted to reach the upper end portion of the windshield, as observed from the patterns describing the defrosted regions of the windshield shown in FIG. 5.

Figure 5:
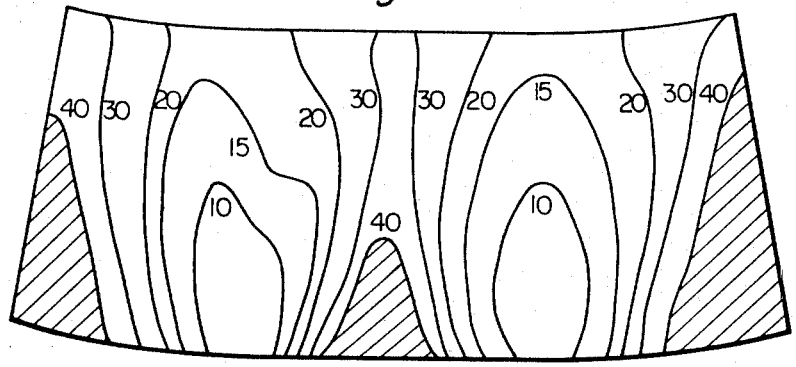

Though succeeding in spurting the hot fluid jet over to the upper limit of the windshield, the nozzle arrangement of FIG. 2 tends to have the fluid jet spread out rather vertically than horizontally with the result that side end portions and a lower central portion (shown hatched) of the windshield are left unswept with the fluid jet, as seen in FIG. 5. A substantial proportion of the fluid jet escapes from the upper end of the windshield, limiting the efficiency at which the heat in the supplied hot fluid jet is transferred to the windshield. The nozzle arrangement of the defroster shown in FIG. 2 is, in this respect, not fully acceptable for the purpose of providing a clear frontal viewing from within a motor vehicle.

Thus, an object of this invention is to provide an improved defroster which is adapted to provide an excellent view through a windshield of a motor vehicle.

Another object is to provide an improved defroster by which the windshield of a motor vehicle can be defrosted substantially throughout its overall surface.

Still another object is to provide an improved defroster which is capable of spurting a hot fluid jet practically omnidirectionally on the windshield.

Still another object is to provide an improved defroster of the character in which the hot fluid jet issuing out of the defroster nozzle has a limited cross sectional area contributing to reduction of the losses in the velocity and temperature of the fluid jet and to alleviating the tendency of the fluid jet to have entrained thereon a fluid or atmospheric air surrounding the fluid jet.

Still another object is to provide an improved defroster in which the hot fluid jet issuing from the defroster nozzle has a sufficiently prolonged core and a sufficiently lessened boundary layer so that the heat transference efficiency is significantly increased.

Still another object is to provide an improved defroster the defroster nozzle of which can be readily fitted in the defroster without resort to meticulous and professional skills in adjusting the angular position of the defroster nozzle with respect to the surface of the windshield.

Still another object is to provide an improved defroster which can be designed, engineered and manufactured in a simple manner and at a low cost.

The defroster achieving these and other objects of this invention generally comprises a source of a hot fluid jet or a heater, a main nozzle leading from the heater and a defroster or defogger nozzle connected to the main nozzle and having an outlet opening directed toward a lower end portion of the windshield. The defroster nozzle has a laterally elongated, generally rectangular cross section which is gradually enlarged toward the outlet opening of the defroster nozzle. The hot fluid jet supplied from the heater is passed to the defroster nozzle through the main nozzle and directed to the lower end portion of the windshield through the outlet opening of the defroster nozzle. According to this invention, the defroster further comprises flow control means which is operable to periodically switch the path of the hot fluid jet between sidewise limits in the defroster nozzle.

The defroster nozzle forming part of the defroster thus constructed may be made up of a pair of spaced lateral wall members each spread out toward its leading end and two side wall members each attached to curved side edges of the lateral wall members. The fluid jet admitted to the defroster nozzle tends to adhere to an adjacent inner surface of either of the side wall members due to the wall known wall-attachment (or Coanda) effect.

The means to switch the path of the fluid jet in the defroster nozzle may be constructed in any desired manner. The switch means may, for instance, operate on a purely fluidic principle or on an electro-fluidic or thermo-fluidic principle. Where any of such principles are to be adopted, the switch means may include a flow control fluid jet circuit having a pair of control nozzles which are opened intermediate the main and defroster nozzles and directed toward each other substantially perpendicularly to the the fluid of thefluid jet admitted to the defroster nozzle. These control nozzles are operative to periodically alternately directing a flow control fluid jet to the hot fluid jet passing between the opposite control nozzles so that the path of the hot fluid jet which has been adhered to an inner surface of one side member of the defroster nozzle is separated therefrom and caused to adhere to an inner surface of the other side wall.

If desired, the switch means may include a mechanical control arrangement so that the path of the fluid jet is switched in a mechanical fashion. The fluid jet admitted to the defroster is, in this instance, phisically forced to alter its direction of flow from one sidewise limit in the defroster nozzle to the other.

Figure 6:
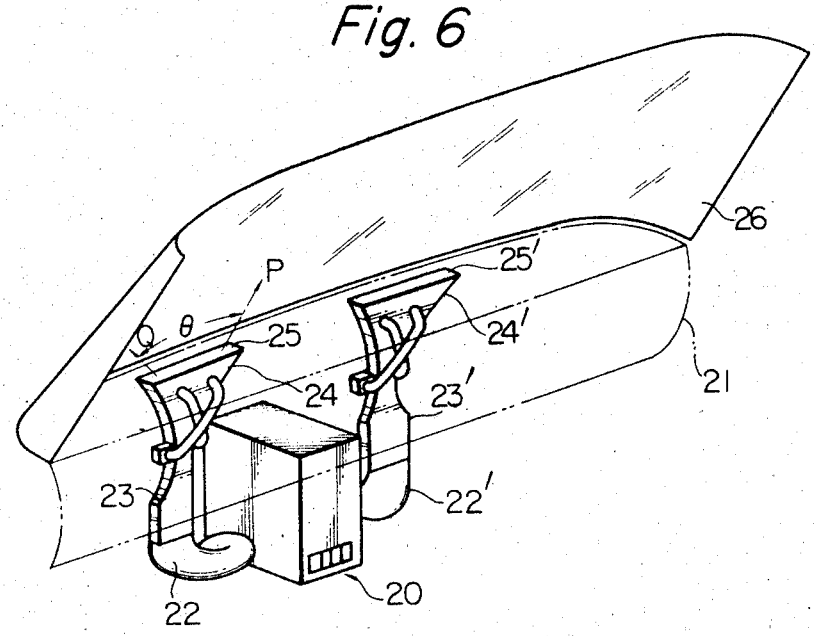
FIG. 6 is a schematic perspective view showing a defroster embodying this invention in a preferred form.

A first preferred embodiment of the defroster of the above described general nature is now illustrated in FIG. 6. As shown in FIG. 6, the defroster according to this invention comprises a source of a hot fluid jet or a heater 20 which is usually installed underneath an instrument panel 21. The construction and operation of the heater 20 per se are well known and as desire, no description thereof will be herein incorporated.

Figure 7:
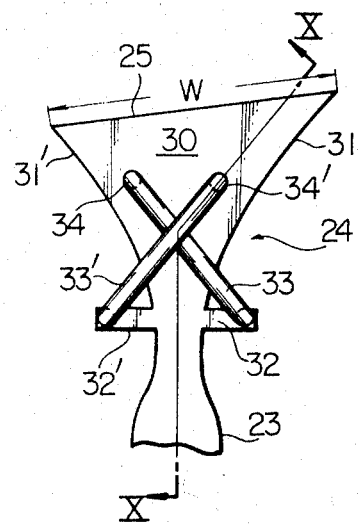
FIG. 7 is a front end view showing a nozzle arrangement of the defroster shown in FIG. 6.
Figure 8:
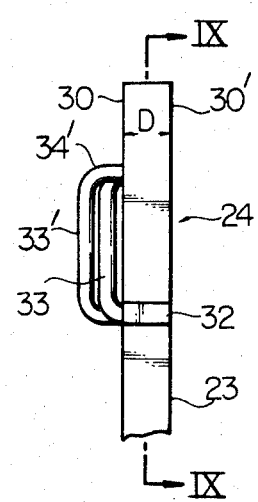
FIG. 8 is a side elevational view showing the nozzle arrangement of FIG. 7.

Ducts 22 and 22' project sidewardly from the heater 20 and main nozzles 23 and 23' are connected respectively to these ducts. A pair of defroster nozzles 24 and 24' are connected respectively to the main nozzles 23 and 23' so that the hot fluid jet supplied from the heater 20 is passed over to these defroster nozzles 24 and 24' through the associated ducts 22 and 22' and main nozzles 23 and 23', respectively. The defroster nozzles 24 and 24' have outlet openings 25 and 25', respectively, which are directed toward a lower end portion of an inner surface of a windshield 26 which is assumed to be covered with frost or fog over its outer surface. Detailed construction of the defroster nozzles 24 and 24' is shown in FIGS. 7 and 8. The defroster nozzles 24 and 24' have a completely identical construction though positioned symmetrically to each other and, therefore, only the construction of the defroster nozzle 24 is herein illustrated.

Referring to FIGS. 7 and 8, the defroster nozzle 24 leading from the main nozzle 23 which is partly shown is made up of a pair of spaced lateral wall members 30 and 30' which are gradually enlarged toward their leading ends and two side wall members 31 and 31' which are attached to curved side edges of the generally fanwise or forwardly flaring lateral wall members 30 and 30'. The defroster nozzle thus possesses a laterally elongated, generally rectangular cross section which is progressively enlarged toward its outlet opening 25. This outlet opening 25 may be preferably sized in a manner to have its width W determined to provide an ample defrosted region in the windshield and its depth D corresponding to the depth of the main nozzle 23. If desired, the depth D of the defroster nozzle 24 may be reduced to about one-half of the depth of the main nozzle 23. The outlet opening 25 may be appropriately curved to follow a curvature, if any, of the windshield.

The particular configuration of the defroster nozzle 24 is intended to provide the wall-attachment effect to the hot fluid jet admitted thereto from the main nozzle 23. Thus, the fluid jet entering the defroster nozzle 24 tends to be re-attached to either of the inner surfaces of the side members 31 and 31' of the defroster nozzle. The side wall members 31 and 31' should therefore be positioned and configurated in a manner to provide a most efficient wall-attachment effect between the fluid jet and the inner surfaces of the side members. To enable the fluid jet to sharply change its streamlines in the defroster nozzle, the lateral wall member 30 and 30' may preferably be enlarged steeply toward their leading ends. The defroster nozzle 24 herein shown is exemplified as shaped substantially symmetrically with respect to a longitudinal center line of the defroster nozzle.

Figure 9:
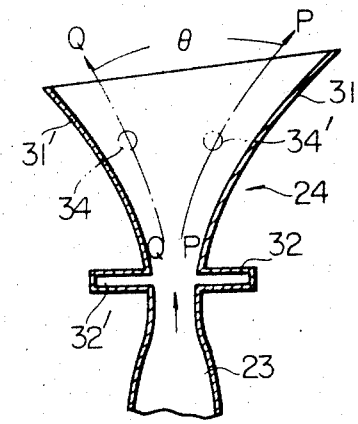
FIG. 9 is a section on line IX—IX of FIG. 8.

A pair of control nozzles 32 and 32' are opened intermediate the main and defroster nozzles 23 and 24, respectively. These control nozzles 32 and 32' are directed to each other substantially perpendicularly to adjacent portions of the side wall members 31 and 31', respectively, as illustrated. A pair of crossing pipelines 33 and 34' lead from the control nozzles 32 and 32' and are opened into the defroster nozzle through apertures 34 and 34' which are formed in an enlarged portion of the lateral wall member 30. These apertures 34 and 34' should be located downstream of a point at which the attachment of the fluid jet to the curved side wall members takes place and substantially on the center lines P—P and Q—Q of the flows of the fluid jet adhering to the side wall members, as indicated in FIG. 9.

The operation of the defroster using the defroster nozzles thus constructed will now be described with reference to FIG. 6 and FIGS. 9 and 10.

The hot fluid jet supplied from the heater 20 is admitted to the defroster nozzles 24 and 24' through the ducts 22 and 22' and the main nozzles 23 and 23', respectively. As will be understood from FIGS. 9 and 10, the hot fluid jet entering the defroster 24, given an impetus resulting from the a symmetrical configuration of the defroster nozzle and/or swayed by impingement against the atmospheric air existing in the defroster nozzle, is caused to be re-attached to the inner surface of either of the side wall member 31 and 31' and to flow in the direction following the line P—P or Q—Q. In this condition, the fluid jet which has a tendency to draw a surrounding fluid thereinto as previously noted sucks in the atmospheric air into the defroster nozzle through the control nozzles 32 and 32'. The atmospheric air is drawn into the control nozzles through the apertures 34 and 34' and pipelines 33 and 33'.

Figure 10:
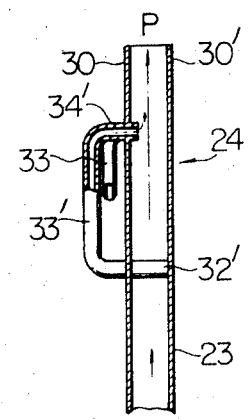
FIG. 10 is a section on line X—X of FIG. 7.

If, now, it is assumed that the fluid jet is reattached to the inner surface of the side wall member 31 while flowing in the direction of P—P in the defroster nozzle, the fluid jet acts to suck in the air in the pipeline 33' into the enlarged portion of the defroster nozzle through the aperture 34' as indicated by the arrow in a broken line in FIG. 10. This limits the flow rate of the atmospheric air from the outside to the control nozzle 32', thereby creating a subatmospheric pressure in the control nozzle 32'. The control nozzle 32, on the other hand, receives the atmospheric air through the associated aperture 34 and pipeline 33 at a practically unlimited rate in the absence of the fluid jet adjacent the aperture 34. When, thus, the pressure in the control nozzle 32' becomes critically lower than the pressure in the other control nozzle 32, then the fluid jet passing between the opposed control nozzle 32 and 32' is separated from the side wall member 31 and pulled over to the opposite side wall member 31'. The fluid jet now advances in the direction of Q—Q in the defroster nozzle. This condition holds even though the pressure in the control nozzle 32 starts diminishing because of the wall-attachment effect between the fluid jet and the side wall member 31'. Attachment of the fluid jet to this side wall member is destroyed when the pressure in the control nozzle 32 becomes critically lower than the pressure in the other control nozzle 32' for the reason above discussed. The path of the fluid jet in the defroster nozzle is in this manner repeatedly switched between the side wall members 31 and 31' with the result that the fluid jet applied to the windshield is oscillated through an angle $\theta$ subtended by the center lines P—P and Q—Q of the flows of the fluid jet, as seen in FIGS. 6 and 10.

As a result of such oscillatory flowing of the hot fluid jet, the boundary layer to be formed over the inner surface of the windshield is significantly thinned and the heat in the supplied hot fluid jet is totally distributed to the practically overall inner surface of the windshield. This is evidently ascertained from observation of FIG. 11 which illustrates patterns of the regions which are defrosted in 10, 15, 20, 30 and 40 minutes after the defroster above described has started operation. As illustrated, the hot fluid jets from the two defroster nozzles spread out uniformly over the surface of the windshield so that substantially the total area of the windshield can be defrosted in about 40 minutes, leaving only a limited region unswept as indicated by a hatched area.

Experiments have been conducted with the defroster above described, revealing that the performance efficiency of the defroster peaks up if the path of the fluid jet is switched at cycles of about 0.5 to 5.0 seconds depending upon the time required for the fluid jet to reach the upper end of the windshield, the time required for the fluid jet to transfer its heat to the windshield and the rate at which the windshield is cooled. If, moreover, an arrangement is made so that the fluid jet is caused to impinge upon the windshield at an angle increased to a certain extent, then the angle $\theta$ to be defined by the center lines P—P and Q—Q of the paths of the fluid jet can be reduced considerably. This is because the fluid jet which is ejected at a high velocity from the defroster nozzle can be readily spread laterally of the windshield.

Figure 12:
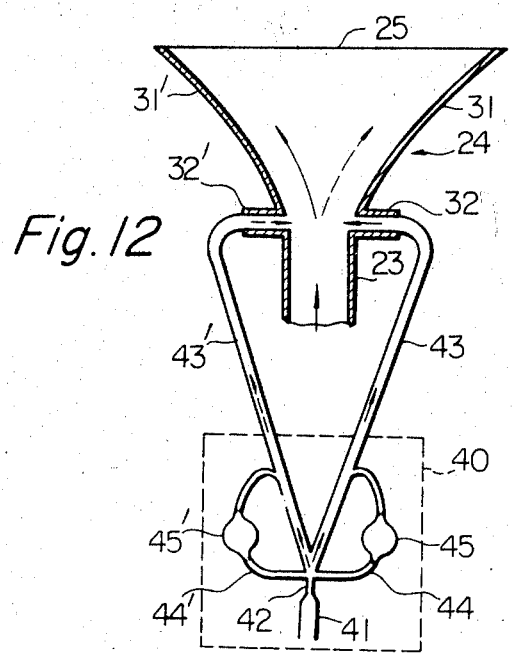
FIG. 12 is a longitudinal sectional view of a modified form of the nozzle arrangement of the defroster according to this invention.

FIG. 12 now illustrates a modification of the nozzle arrangement of the defroster according to this invention. Similarly to the arrangement shown in FIGS. 7 to 10, this modified nozzle arrangement operates on the purely fluidic principle.

The defroster nozzle, denoted by reference numeral 24, is in itself essentially similar to that previously described, including curved side wall members 31 and 31' and having a generally rectangular cross section which is enlarged toward an outlet opening 25. The defroster nozzle 24 is also provided with opposed control nozzles 32 and 32' which are disposed similarly to those incorporated in the defroster nozzle of FIGS. 7 to 10. Different from the latter defroster nozzle in which the power fluid jet supplied from the heater 10 (FIG. 6) is utilized as the flow control fluid, the defroster nozzle shown in FIG. 12 uses compressed air which is supplied from an independent source. This compressed air is passed alternately to the control nozzles 32 and 32' by means of a fluidic oscillator 40. This fluidic oscillator per se is well known in the art, disclosed in U.S. Pat. No. 3,185,166 to Billy M. Horton et al.

The fluidic oscillator 40 includes an input port 41 which leads from assuitable source (not shown) of compressed air. This input port 41 leads through an intermediate passage or constriction 42 and outlet ports (not numbered) to split pipelines 43 and 43' which are connected to the control nozzles 32 and 32', respectively. The pipelines 43 and 43' have respective looplines 44 and 44'. These looplines 44 and 44' are open at the constriction 42 in an opposed relationship to each other and are directed substantially perpendicularly to the path of the compressed air flowing therebetween. A pair of fluidic capacitors 45 and 45' are interposed in the looplines 44 and 44', respectively, intervening between orifices (not numbered) formed in the looplines.

If, now, the flow of the compressed air supplied through the input port 41 is directed to the pipeline 43 as indicated by the arrows in solid line, then the compressed air impinges substantially perpendicularly upon the hot fluid jet which is on the point of entering the drfroster nozzle 24 with the result that the fluid jet is switched over to the side wall member 31' as indicated by the arrow in a solid line. While the flow of the compressed air is established through the pipeline 43, the compressed air is passed to the capacitor 45 through the loopline 44 at a limited rate, giving rise to the pressure in this capacitor.

When the pressure in the capacitor 45 exceeds a predetermined level, the compressed air stored therein is released into the constriction 42 through the loopline 44 and impinges substantially perpendicularly upon the stream of the compressed air flowing through the constriction. The flow of the compressed air is consequently switched over to the opposite pipeline 43' as indicated by the arrows in broken line. The hot fluid jet which has been attached to the side wall member 31' of the defroster nozzle is impinged upon by the flow of the compressed air from the pipeline 43' and switched over to the opposite side wall member 31, as indicated by the arrow in broken line. The path of the fluid jet in the defroster nozzle 24 is in this manner periodically switched between the side wall members 31 and 31' exactly as the stream of the compressed air flowing through the constriction 42 is switched between the pipelines 43' and 43, respectively. The nozzle arrangement of FIG. 12 is thus operative essentially similarly to the arrangement of FIGS. 7 to 10.

The compressed air to be supplied to the fluidic oscillator 40 may have a pressure ranging from 0.1 to 1 kgs/cm².

Figure 13:
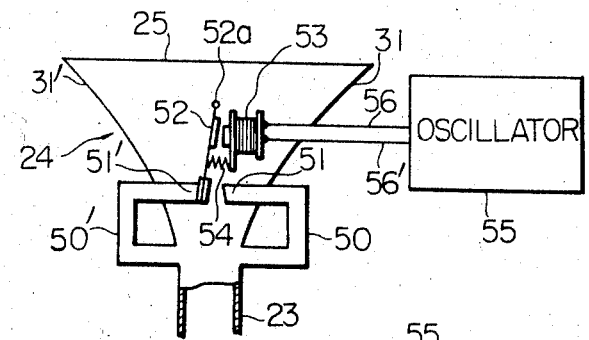
FIG. 13 is a front end view of a further modified form of the nozzle arrangement.
Figure 14:
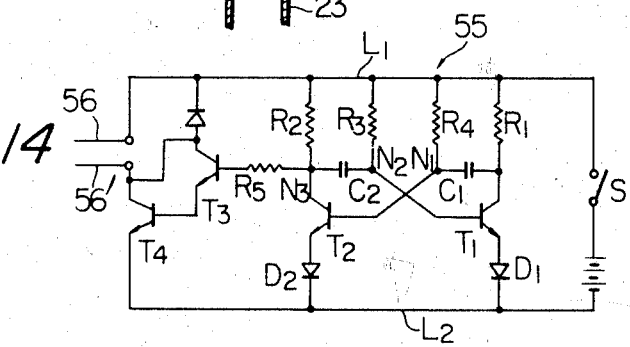
FIG. 14 is a diagram showing an example of electrical circuit connections for use in the nozzle arrangement of FIG. 13.

FIG. 13 illustrates a nozzle arrangement which is operative on the electro-fluidic principle. The defroster nozzle per se is constructed similarly to the previously described and has a generally rectangular, laterally elongated section which is constituted by the curved side wall members 31 and 31' and an enlarged outlet opening 25. A pair of opposed control nozzles 50 and 50' open intermediate the main and defroster nozzles which are designated by reference numerals 23 and 24, respectively. The control nozzles 50 and 50' have their outlet ports (not numbered) directed toward each other generally perpendicularly to the adjacent side wall members 31 and 31', respectively. The control nozzle 50 and 50' have inlet ports 51 and 51', respectively, which are opened to the atmosphere and which are directed toward each other. A magnetic rocking arm 52 is positioned to be rockable between these inlet ports of the control nozzles about a pivot 52a. The inlet ports 51 and 51' of the control nozzles are thus closed and opened as the rocking arm 52 moves therebetween. The magnetic rocking arm 52 is associated with a solenoid 53 which is engageable with the rocking arm when excited. A compression spring 54 biases the rocking arm 52 toward a position to close one of the inlet ports 51 and 51' of the control nozzles. This compression spirng 54 is herein shown as positioned between the rocking arm 52 and the solenoid 53 so as to bias the rocking arm to close the inlet port 51' of the control nozzle 50'. The solenoid 53 has its solenoid coil 53 (not numbered) connected to a suitable oscillator 55 through lines 56 and 56'. This oscillator 55 may be a known astable multivibrator having a circuit arrangement which is shown in FIG. 14 merely by way of example. Since this circuit arrangement per se is well known in the art, only the operation thereof will be herein discussed.

With the control switch S closed, collector voltages are applied to the collectors of the transistors $T_1$ and $T_2$ through the resistors $R_1$ and $R_2$ and, at the same time, voltages are applied to the bases of these transistors through the resistors $R_3$ and $R_4$, respectively. If, in this condition, the base current flows through the transistor $T_1$ to the diode $D_1$, then the other transistor $T_2$ is cut off and the capacitor $C_1$ starts to be charged with the current flowing across the resistors $R_4$ and $R_1$. When the capacitor $C_1$ is saturated so that the current ceases to flow from the resistor $R_4$ to the resistor $R_1$, the potential at the node $N_1$ is equalized with the potential in the positive bus line $L_1$. The potential at the node $N_1$ thus becomes higher than the potential at the node $N_2$ because, in this condition, a base current flows through the resistor $R_3$ to the emitter of the transistor $T_1$. A current now starts to flow through the resistor $R_4$, the base of the transistor $T_2$ and the diode $D_2$, while the transistor $T_1$ is cut off. The capacitor $C_2$ is consequently charged with the current flowing through the resistor $R_3$ and the transistor $T_2$. The transistors $T_1$ and $T_2$ thus become alternately conducting so that the potential at the node $N_3$ is equalized laternately with the potentials in the positive and negative bus lines $L_1$ and $L_2$.

When the positive potential apperas at the node $N_3$, the base current flows to the negative bus line $L_2$ through the resistor $R_5$, and the respective bases and emitters of the transistors $T_3$ and $T_4$. At the same time, a collector voltage is supplied from the positive bus line $L_1$ to the collectors of the transistors $T_3$ and $T_4$ through the lines 56 and 56' which are connected to the solenoid coil of the solenoid 53 (FIG. 13). The transistors $T_3$ and $T_4$ thus become conducting so that an operating current flows from the positive bus line $L_1$ to the negative bus line $L_2$ through the lines 56 and 56' and the collectors and emitters of the transitors $T_3$ and $T_4$.

When, in operation, the solenoid 53 is kept unexcited in the absence of an output voltage from the oscillator 55, the magnetic rocking arm 52 is forced by the compression spring 54 to close the inlet port 51' of the control nozzle 50'. A subatmospheric pressure thus obtains in this control nozzle 50' so that the hot fluid jet to be admitted to the defroster nozzle 24 is reattached to the inner surface of the side wall member 31' of the defroster nozzle. When an output voltage is supplied from the oscillator 55 so that the solenoid 53 is excited, then the magnetic rocking arm 52 is attracted to the solenoid and moved to a position to close the opposite inlet port 51 of the control nozzle 50 against the action of the compression spring 54. A subatmospheric pressure now develops in the control nozzle 50 and, when the subatmospheric pressure reaches a predetermined level, then the fluid jet which has been re-attached to the side wall member 31' is separated therefrom and pulled over to the opposite side wall member 31 under the influence of the subatmospheric pressure. The fluid jet is now caused to flow over the inner surface of the side wall member 31. Through repetitions of these alternate actions, the fluid jet is periodically switched from one to the other of the side wall members 31 and 31', similarly to the nozzle arrangements previously discussed.

Figure 15:
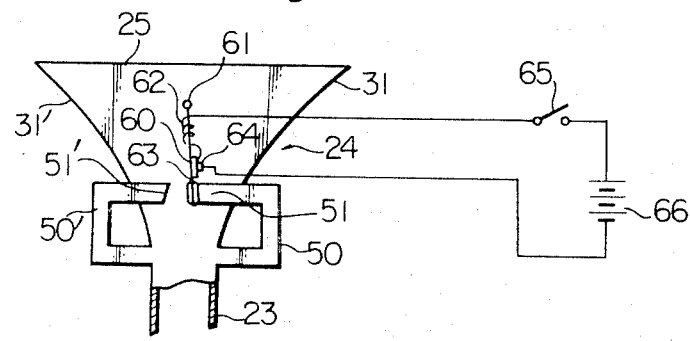
FIG. 15 is a view similar to FIG. 13 but shows a still further modified form of the nozzle arrangement.

FIG. 15 illustrates a modification of the nozzle arrangement of FIG. 13 which is adapted to operate on a thermo-fluidic principle. The nozzle arrangement of FIG. 15 is functionally similar to the arrangement shown in FIG. 13, including similar control nozzles 50 and 50' having inlet ports 51 and 51', respectively.

In the arrangement of FIG. 15, the inlet ports 51 and 51' of the control nozzles are closed and opened by means of a heat-sensitive rocking arm 60 using a bimetal. This heat-sensitive rocking arm 60 is positioned to be rockable between the inlet ports 51 and 51' of the control nozzles 50 and 50' about a stationary support 61. The rocking arm 60 is surrounded by a resistive conductor 62 which is connected at one end to a moving contact 63 fast on the rocking arm 60 and at the other end to a stationary contact 64 through a switch 65 and a source 66. The heat-sensitive rocking arm 60 is adapted to be normally held in a position to close one of the inlet ports, say the port 51 for instance, of the control nozzles and to be warped toward the oppsite inlet port, say the port 51' as shown, when heated. When, thus, the rocking arm 60 is in the position to close the inlet port 51, the moving contact 63 secured thereto is held in contact with the stationary contact 64 so that the resistive conductor 62 is energized and heated to heat the rocking arm 60. The rocking arm 60 is caused to warp toward the opposite inlet port 51' and, when the rocking arm is heated to a predetermined temperature, it moves and closes the inlet port 51' and accordingly the moving contact 63 is disconnected from the stationary contact 64. The resistive conductor 62 is now de-energized, ceasing to heat the rocking arm 60. The rocking arm 60 is allowed to cool until it returns to the position to the inlet port 51, and thus hunts between the two ports 51 and 51' by a snap action. Repetition of these motions of the heat-sensitive rocking arm 60 results in periodical switching of the fluid jet between the side wall members 31 and 31', similarly to the nozzle arrangement shown in FIG. 13.

FIGS. 16 to 20 illustrate nozzle arrangements operating in a mechanical fashion using deflector means which is adapted to direct the fluid jet from one side of the defroster nozzle to the other.

Figure 16:
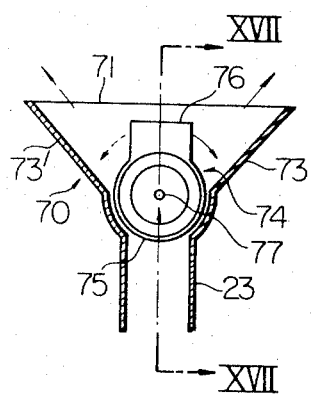
FIG. 16 is a longitudinal sectional view showing a still further modified form of the nozzle arrangement applicable to the defroster according to this invention.
Figure 17:
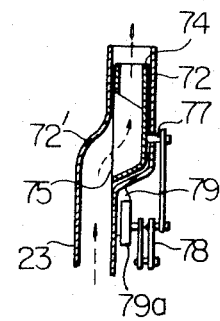
FIG. 17 is also a longitudinal sectional view, taken on line XVII—XVII, of the nozzle arrangement of FIG. 16.
Figure 18:
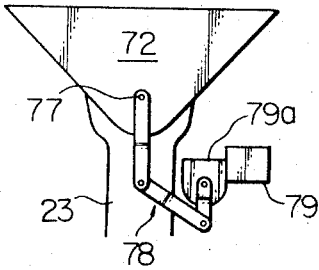
FIG. 18 is a front end view of the nozzle arrangement shown in FIGS. 16 and 17.

The nozzle arrangement shown in FIGS. 16 to 18 includes a defroster nozzle which is now designated by reference numeral 70. This defroster nozzle 70, merging from the main nozzle 23, is constructed essentially similarly to the defroster nozzles 24 previously shown, having a generally rectangular, laterally elongated cross section which is enlarged to flares toward an outlet opening 71. The defroster nozzle 70, however, is shown to be made up of spaced lateral wall members 72 and 72' which are offset in their forward portions (not numbered) and side wall members 73 and 73' which are also offset in their forward portions to fit side edges of the lateral wall members.

A deflector nozzle 74 having inlet and outlet ports 75 and 76, respectively, is rotatably mounted in the offset portion of the defroster nozzle 70 as seen in FIGS. 16 and 17. The inlet port 75 of this deflector nozzle 74 is opened toward the main nozzle 23 while the outlet port 76 thereof is directed toward the outlet opening 71 of the defroster nozzle 70. The detector nozzle 74 is rotatable in both directions and through a limited angle in the defroster nozzle 70 about an with a shift 77 which is rotatable relative to the defroster nozzle 70 by suitable driving means. Thus, the outlet port 76 of the deflector nozzle 74 is oriented continually from one side wall member of the defroster nozzle to the other as the deflector nozzle 74 rotates about the shaft 77 through an angle subtended by the side wall members 73 and 73'.

The driving means to rotate the deflector nozzle 74 together with the shaft 77 may be constructed and arranged in any desired manner. The shown example of such driving means includes a three-arm linkage mechanism 78 which is secured at one end to the shaft 77 and operatively connected to a motor 79 through a reduction gear 79a. The linkage mechanism 78 is driven by the motor 79 so as to rotate the deflector nozzle 74 through the shaft 77 in such a manner that the outlet port 76 of the deflector nozzle oscillate between the side wall members 73 and 73'. As the deflector nozzle 74 is rotated in this manner, the path of the fluid jet passed therethrough is deflected continually from the direction of the arrow in solid line adjacent the side wall member 73 to the direction of the arrow in broken line adjacent the opposite side wall member 73'.

Figure 19:
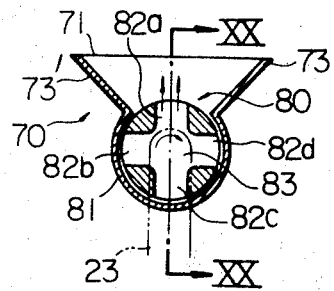
FIG. 19 is a view similar to FIG. 16 but shows a still further modified form of the nozzle arrangement.
Figure 20:
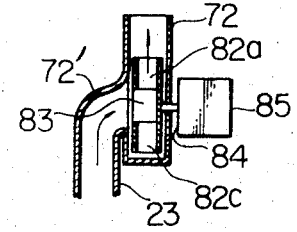
FIG. 20 is a longitudinal sectional view, taken on line XX—XX, of the nozzle arrangement shown in FIG. 19.

Turning to FIGS. 19 and 20, a modification of the nozzle arrangement of FIGS. 16 to 18 is shown, which also uses a defroster nozzle 70 constructed essentially similarly to the defroster nozzle of the arrangement shown in FIGS. 16 to 18.

This modified nozzle arrangement uses a rotary deflector nozzle 80 which is rotatably mounted in the offset portion of the defroster nozzle 70. This offset portion of the defroster nozzle may be formed with a generally rounded portion 81 which is configured to accommodate rotation of the deflector nozzle 80 therein. The deflector nozzle 80 has formed therein a plurality of radially spaced bores which are shown, by way of example, as four in number as indicated at 82a, 82b, 82c and 82d in FIG. 19. These bores in the deflector nozzle 80 meet one another substantially centrally of the deflector nozzle 80 as at 83. The deflector nozzle 80 thus constructed is rotatable in the rounded portion 81 about a shaft 84 which is rotatable relative to the defroster nozzle 70 and which is connected to and driven by a geared motor 85.

As the deflector nozzle 81 is rotated in the rounded portion 81, the radial bores 82a to 82d are successively brought into alignment with the outlet opening 71 of the defroster nozzle 70. The aligned radial bore which is shown as the bore 82a thus moves from one of the side wall memers 73 and 73' to the other depending upon the direction of rotation of the deflector nozzle 80 which is shown as rotated clockwise as indicated by an arrow in FIG. 19. As a consequence, the path of the fluid jet entering the deflector nozzle 80 through the central space 83 therein is moved through an angle starting on one side of the defroster nozzle 70 to the other intermittently as the radial bores 82a to 82d are opened toward the outlet opening 71 of the defroster nozzle 70.

Figure 21:
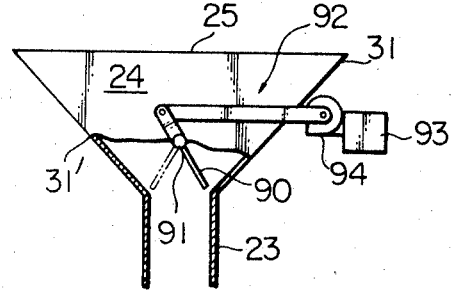
FIG. 21 is a front end view partly in section of a still further modified form of the nozzle arrangement for use in the defroster embodying this invention.

FIG. 21 illustrates another from of the mechanically operative nozzle arrangement in which the defroster nozzle is shown to be essentially similar to the defroster nozzles 24 in the arrangement of FIGS. 7 to 15 and accordingly denoted as such. The nozzle arrangement herein shown uses a pivotal deflector plate 90 which is located at an inlet to the defroster nozzle 24. This deflector plate 90 is pivotally connected to the defroster nozzle 24 or more specifically to the lateral wall members (not numbered herein) thereof through a pivotal shaft 91. The deflector plate 90 is angularly moved or oscillated about this pivotal shaft 91 through an angle which is subtended by directions approximately parallel to the adjacent inner surfaces of the side wall members 31 and 31', viz., between the positions indicated in solid and broken lines respectively. This deflector plate 90 is driven by suitable driving means which may include a crank linkage mechanism generally denoted by numeral 92. This linkage mechanism 92, connected at one end to the deflector plate 90, is connected to and driven by a motor 93 through a reduction gear 94.

As the deflector plate 90 is moved between its angular limits indicated by the solid and broken lines in FIG. 21, the fluid jet entering the defroster nozzle 24 is forced to change its direction of advance by means of the deflector plate thus being moved. The path of the fluid jet flowing through the defroster nozzle 24 is consequetly deflected from one side of the defroster nozzle to the other alternately as the deflector plate is moved or oscillated. This provides a result which is essentially similar to those attained in the various embodiments of this invention previously described.

Figure 11:
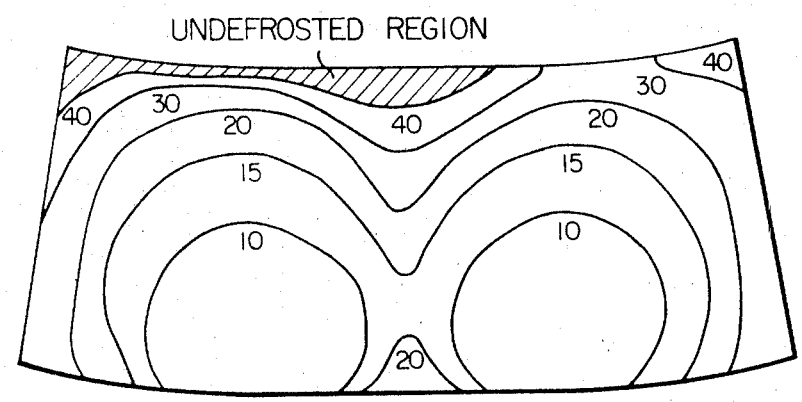
FIG. 11 is a view showing patterns of defrosted regions as attained with use of the defroster shown in FIG. 6.

Experiments conducted with each of the nozzle arrangements shown in FIGS. 12 to 21 have shown that these arrangements provide a performance quality which is comparable to that attained by the use of the first embodiment of this invention and that the defrosting efficiency or the patterns of the defrosted regions provided by such arrangements is largely similar to that visualized in FIG. 11.

It will now be appreciated from the foregoing description that the defroster using any of the defroster nozzle arrangements herein disclosed is capable of providing an excellent command of view through the windshield of the motor vehicle even in extreme environments of cold, frost or fog because the frost or fog depositing over the outer and/or inner surfaces of the windshield can be cleared off throughout the practically total area of the windshield. The hot fluid jet to be a plied or sprayed to the inner surface of the windshield has an only limited cross sectional area so as to contribute to reduction of the loses in the flow velocity and the temperature of the fluid jet and to alleviating the tendency of the fluid jet to draw thereinto a fluid or atmospheric air surrounding the fluid jet released from the defroster nozzle. The hot fluid jet from the defroster nozzle therefore has a sufficiently prolonged core (FIG. 3) and a sufficiently lessened boundary layer, significantly giving rise to the efficiency of the heat transference from the fluid jet to the windshield. The defroster, in whichever form herein described, can be fitted in the defroster without resort to meticulous and professional skills which have thus far been indispensable in adjusting the angular position of the defroster nozzle with respect to the surface of the windshield. The defroster having these advantages can be designed, manufactured and assembled in a simple manner and at a low cost and accordingly is expected to provide useful and practical applications in the motor vehicles. It is apparent that the improvements herein described can be incorporated not only in the defrosters but in demisters in general.

What is claimed is:

1. A device for oscillating a flow of fluid across a surface of a windshield of a motor vehicle comprising, a source of a flow of fluid, a main nozzle communicating with said source, an outlet nozzle leading from said main nozzle and having an outlet opening adjacent an end edge of a wind-shield, said outlet nozzle including a pair of spaced lateral wall members diverging toward said outlet and being disposed opposite each other and a pair of spaced side wall members secured to side edges of said lateral wall members and being disposed opposite each other to form a generally rectangle configuration diverging in cross section toward said outlet, a pair of control nozzles opening into and intermediate said main and outlet nozzles communicating through said side wall members and being disposed opposite each other, and a pair of pipelines each communicating with one of said control nozzles and terminating in a respective port formed in a portion of a common lateral wall member, each said port being disposed nearer to the side wall member opposite to the side wall member relative to which the corresponding control nozzle is disposed, each of said pipelines connecting with said respective port in said lateral wall member substantially perpendicularly thereto.

2. A device according to claim 1, in which said side wall members are curved in a diverging configuration.

3. A device according to claim 1, including means to heat said flow of fluid.

4. A device according to claim 1, in which each said port is located downstream of a point at which attachment of the fluid flow to said side wall members takes place and substantially on center lines of the flows of fluid attached to said side wall members respectively.

* * * * *